United States Patent [19]

Redman

[11] 3,723,600
[45] Mar. 27, 1973

[54] RARE EARTH TELLURITES AND METHOD OF PRODUCING SAME

[75] Inventor: Michael J. Redman, Belmont, Mass.

[73] Assignee: Kennecott Copper Corporation, New York, N.Y.

[22] Filed: Oct. 18, 1971

[21] Appl. No.: 190,267

Related U.S. Application Data

[63] Continuation-in-part of Ser. No. 878,915, Nov. 21, 1969, abandoned.

[52] U.S. Cl............................ 423/263, 423/508, 106/288 B, 252/63.5, 252/301.4 S
[51] Int. Cl. ............................................. C22b 59/00
[58] Field of Search ................... 23/50 R, 21, 16, 20; 106/288 I; 252/63.5, 301.4 S

[56] References Cited

UNITED STATES PATENTS

| 3,053,616 | 9/1962 | Bayer | 23/50 R |
|---|---|---|---|
| 3,053,617 | 9/1962 | Bayer | 23/50 R |
| 3,053,618 | 9/1962 | Bayer | 23/50 R |
| 3,053,619 | 9/1962 | Bayer | 23/50 R |
| 3,309,168 | 3/1967 | Bayer | 23/50 R |
| 3,309,169 | 3/1967 | Bayer | 23/50 R |
| 3,418,246 | 12/1968 | Royce | 252/301.4 S |

OTHER PUBLICATIONS

Kent et al., "Inorganic Chemistry," Vol. 1, Nov. 1962, pp. 956–958.

*Primary Examiner*—Herbert T. Carter
*Attorney*—John L. Sniado et al.

[57] ABSTRACT

Tellurium compounds having the general formula $(A_xB_y)Te_4O_{11}$ where A and B is a rare earth metal or yttrium, $x$ is from 0 to 2, $y$ is from 0 to 2, and $x$ plus $y$ is 2. Where A and B are the same metal the formula is $M_2Te_4O_{11}$. The compounds are prepared by reactions between $TeO_2$ and the rare earth oxides.

10 Claims, No Drawings

RARE EARTH TELLURITES AND METHOD OF PRODUCING SAME

This application is a continuation-in-part of application Ser. No. 878,915 filed Nov. 21, 1969 and now abandoned.

BACKGROUND OF THE INVENTION

The prior patent art shows a number of tellurite compounds. For example U.S. Pat. No. 3,053,616 discloses titanium, zirconium and tin tellurites and U.S. Pat. No. 3,053,618 teaches the method for making the titanium, zirconium and tin tellurites. U.S. Pat. No. 3,053,617 discloses the compound cerium tellurite and U.S. Pat. No. 3,053,619 teaches the method of producing the cerium tellurite. Compounds containing hexavalent tellurium are disclosed in U.S. Pat. Nos. 3,309,168 and 3,309,169.

SUMMARY

This invention is directed to new tellurium compounds having the general formula $(A_xB_y)Te_4O_{11}$ where A and B is a rare earth metal or yttrium, $x$ is from 0 to 2, $y$ is from 0 to 2, and $x$ plus $y$ is 2. Where A and B are the same rare earth metal or yttrium the formula may be $$M_2Te_4O_{11}$$

where M is a rare earth metal or yttrium.

This invention is also directed to a process for preparing the rare earth and yttrium compounds containing tellurium. These compounds are prepared by the solid state reactions between tellurium dioxide and the rare earth sesquioxides. These compounds may also be prepared as crystals from melts containing excess tellurium dioxide above that needed for the formation of $(A_xB_y)Te_4O_{11}$ and $M_2Te_4O_{11}$.

The new metal tellurites of this invention find application as laser host materials. The dielectric properties of the new tellurites allow them to be used in electronic components where materials having relatively high dielectric constants are required. The compounds have very desirable colors and are used as pigments in ceramic glazes, enamels, paints and dyes.

DESCRIPTION OF THE PREFERRED EMBODIMENTS

The products of this invention are compounds of the formula $(A_xB_y)Te_4O_{11}$ wherein A and B are a rare-earth metals selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) or yttrium (Y).

According to the invention the new compounds can be prepared by mixing weighed mixtures of tellurium dioxide and a rare earth oxide, or a mixture of rare earth oxides in the ratio of from about 4 moles tellurium dioxide to about 1 mole of rare earth oxide, or 1 mole equivalent of mixed rare earth oxides and carrying out a solid-state reaction. The ratios of the oxides should be substantially as stated, but higher ratios can be used. When ratios greater than 4:1 are used the compounds of this invention are produced in admixture with the excess tellurium dioxide. The reactants are intimately admixed in finely divided powder form. The intimately admixed powders are compacted into a cohesive mass, wrapped in platinum foil to prevent volatilization losses, and heated in a non-reducing atmosphere such as air or nitrogen. Temperatures of firing are from about 700° to 1,000° C. Firing time is generally from about 5 to 20 hours, preferably 8 to 10 hours, after which the compound is cooled to room temperature.

Single crystals of the new compositions of this invention may be prepared from melts containing about 85 mole percent tellurium dioxide and 15 mole percent rare-earth oxide or 15 mole percent equivalent of mixed rare earth oxides or yttrium oxide contained in a tightly covered platinum crucible by cooling in air. The melt temperatures ran from about 850° to 1,000° C and cooling rates of 2°–20° per hour were employed. Cooling rates up to about 100° C per hour may be used but result in smaller crystals that are difficult to separate from the tellurium dioxide matrix. The crystals were then mechanically separated from the solidified melt. It is also possible to produce larger crystals by employing a seeding technique by introducing a seed crystal or a platinum wire into the melt on which the crystals grow.

EXAMPLE I

Preparation of $La_2Te_4O_{11}$

Twenty mole per cent of $La_2O_3$ (0.651 gm) was intimately mixed with 80 mole percent of $TeO_2$ (1.276 gm) and pressed into pellet form. The pellets were wrapped in platinum foil and fired in a nitrogen atmosphere at about 800° C for 8 to 10 hours. The reacted oxides were cooled and examined. A white powdered product was obtained. Table II below gives the x-ray powder diffraction pattern.

EXAMPLE II

Preparation of $Gd_2Te_4O_{11}$

Following the same general procedure as outlined in Example I, 80 mole percent $TeO_2$ (1.276 gm) was reacted in the solid state with 20 mole percent of $Gd_2O_3$ (0.725 gm) for about 8 hours at 800° C. A white powdered product was obtained after cooling to room temperature.

EXAMPLE III

Preparation of $Lu_2Te_4O_{11}$

Following the procedures of Examples I and II, 20 mole percent $Lu_2O_3$ (0.796 gm) was reacted with 80 mole percent $TeO_2$ (1.276 gm) for about 8 hours at 800° C. A white powdered product was obtained. The x-ray powder diffraction pattern is given in Table III below.

EXAMPLE IV

Preparation of $Y_2Te_4O_{11}$

Eighty mole percent $TeO_2$ (1.276 gm) was reacted in the solid state with 20 mole percent $Y_2O_3$ (0.4516 gm) at about 800° C for about 8 hours. A white powdered product with a faint yellowish cast was obtained. The product had the unit cell dimensions as shown in Table I below.

EXAMPLE V

Preparation of Single Crystals of $La_2Te_4O_{11}$

Fifteen mole percent $La_2O_3$ (4,887 gm) was intimately mixed with eighty-five mole percent $TeO_2$ (13.56 gm) and melted in a platinum crucible in air at about 800° C. The melt was maintained at 900° C for 2 hours and then cooled at 20° per hour for 15 hours. The furnace was then shut off and allowed to cool down to room temperature. Colorless transparent single crystals of $La_2Te_4O_{11}$ were then separated from the $TeO_2$ matrix.

EXAMPLE VI

Preparation of Single Crystals of $Y_2Te_4O_{11}$

Following the procedure of Example V, 12.5 mole percent $Y_2O_3$ (2.822 gm) was mixed and melted with 87.5 mole percent $TeO_2$ (13.96 gm). Colorless single crystals of $Y_2Te_4O_{11}$ were found in a matrix of $TeO_2$.

EXAMPLE VII

Preparation of Single Crystals of $Gd_2Te_4O_{11}$

Fifteen mole percent (5.436 gm) $Gd_2O_3$ was mixed and melted with 85 mole percent (13.56 gm) $TeO_2$ in accordance with the procedure of Example V. Colorless transparent crystals of $Gd_2Te_4O_{11}$ were recovered in a matrix of $TeO_2$.

EXAMPLE VIII

Preparation of Neodymium Substituted Lanthanum Tellurite.

1. Eighty-five mole percent $TeO_2$ (13.56 gm), three mole percent $Nd_2O_3$ (1.000 gm) and twelve mole percent $La_2O_3$ (3.909 gm) were intimately mixed, placed in a platinum crucible and heated to 900° C. Upon controlled cooling mixed crystals of neodymium substituted lanthanum tellurite was obtained. The crystals were blue in color and transparent. Chemical analysis indicated the crystals contained 4.9 mole percent $Nd_2O_3$. The formula may be represented as $(La_xNd_y)Te_4O_{11}$ where x is 1.51 and y is 0.49.

2. Following the above procedure, 14 mole percent $La_2O_3$ (72.98 gm), 1 mole percent $Nd_2O_3$ (5.386 gm) and 85 mole percent $TeO_2$ (217.06 gm) were mixed and melted. A seed crystal of $La_2Te_4O_{11}$ was introduced from the top and crystalline material grew on the seed beginning at temperatures from about 765° to 772° C. A light blue mixed single crystal was obtained containing 1.2 mole percent $Nd_2O_3$ corresponding to the formula $(La_{1.88}Nd_{.12})Te_4O_{11}$.

The tellurium contents of the compositions were checked by two methods. Compositions were dissolved in concentrated hydrochloric acid followed by reduction to elemental tellurium with sulfurous acid and subsequent weighing. The second method, based on a method devised by Levin and Swann, Talanta 1 (1958), 276–80, in which iodine, liberated by the oxidation of Te (IV) by iodide ion, is titrated against thiosulfate.

Single crystals of the new compounds of this invention corresponding to the formula $(A_xB_y)_2Te_4O_{11}$ and $M_2Te_4O$ were obtained by slow cooling of tellurium dioxide rich melts. The tellurites of all the rare-earth elements examined gave x-ray powder film patterns and diffractometer traces at room temperatures showing that they form an isomorphous series. The x-ray data is given in Table I below.

TABLE I

Unit Cell Dimensions of $(A_xB_y)_2Te_4O_{11}$

| Rare earth or yttrium | At. No. | a(A) | b(A) | c(A) | β | Volume $A^3$ | X-Ray Density $g/cm^3$ |
|---|---|---|---|---|---|---|---|
| La | 57 | 12.80 | 5.278 | 16.42 | 105.92 | 1066.5 | 6.01 |
| Nd | 60 | 12.60 | 5.216 | 16.27 | 106.00 | 1028.4 | 6.30 |
| Sm | 62 | 12.56 | 5.174 | 16.19 | 106.00 | 1011.2 | 6.48 |
| Eu | 63 | 12.50 | 5.163 | 16.14 | 106.02 | 1001.2 | 6.57 |
| Gd | 64 | 12.46 | 5.142 | 16.09 | 106.08 | 991.1 | 6.71 |
| Dy | 66 | 12.40 | 5.120 | 16.04 | 106.08 | 978.7 | 6.86 |
| Ho | 67 | 12.37 | 5.105 | 16.00 | 106.12 | 971.0 | 6.95 |
| Y | 39 | 12.37 | 5.100 | 15.99 | 106.12 | 968.8 | 5.92 |
| Er | 68 | 12.35 | 5.089 | 15.97 | 106.14 | 964.4 | 7.03 |
| Tm | 69 | 12.29 | 5.073 | 15.94 | 106.10 | 955.2 | 7.12 |
| Yb | 70 | 12.26 | 5.069 | 15.92 | 106.15 | 950.6 | 7.21 |
| Lu | 71 | 12.26 | 5.058 | 15.90 | 106.18 | 946.6 | 7.27 |

For the purpose of identification, Tables II and III show the interplanar spacings and Miller indices assigned to the peaks in the forward-reflection regions of the diffractometer traces of the first and last members of the rare-earth series. The intensities are listed as peak heights above background and expressed as percentages of the intensity of the strongest line.

TABLE II

Indexed X-Ray Powder Diffraction Pattern for $La_2Te_4O_{11}$

| d(Å) | I | hkl | | |
|---|---|---|---|---|
| 7.87 | 9 | 002 | | |
| 3.386 | 100 | 113 | | |
| 3.239 | 4 | 114 | 310 | |
| 3.073 | 65 | 313 | 400 | |
| 2.973 | 4 | 204 | | |
| 2.702 | 39 | 206 | | |
| 2.634 | 10 | 006 | 020 | 402 |
| 2.525 | 1 | 115 | 313 | |
| 2.303 | 2 | 316 | 512 | |
| 2.298 | 1 | 223 | | |
| 2.209 | 70 | 116 | 206 | |
| 2.003 | 14 | 420 | | |
| 1.994 | 3 | 423 | | |
| 1.892 | 24 | 513 | | |
| 1.887 | 14 | 606 | 226 | |
| 1.774 | 2 | 406 | | |
| 1.769 | 2 | 423 | | |
| 1.726 | 12 | 712 | 713 | 131 |
| 1.715 | 1 | 027 | 132 | |
| 1.710 | 26 | 119 | | |
| 1.694 | 13 | 226 | | |
| 1.634 | 4 | 133 | | |
| 1.595 | 6 | 119 | 333 | 802 |
| 1.591 | 1 | 331 | | |
| 1.588 | 1 | 625 | 804 | |
| 1.584 | 10 | 519 | | |
| 1.539 | 7 | 800 | | |
| 1.536 | 4 | 626 | | |
| 1.441 | 1 | 533 | | |
| 1.438 | 12 | 802 | 606 | |
| 1.419 | 10 | 1.1.11 | 319 | 534 517 |
| 1.367 | 2 | 823 | 912 | |
| 1.352 | 4 | 821 | | |
| 1.330 | 3 | 820 | 625 | 533 |
| 1.316 | 15 | 0.0.12 | 804 | 336 |

TABLE III

Indexed X-Ray Powder Diffraction Pattern for $Lu_2Te_4O_{11}$

| d(Å) | I | hkl | | |
|---|---|---|---|---|
| 7.62 | 9 | 002 | | |
| 3.258 | 100 | 113 | | |
| 3.124 | 2 | 114 | 312 | |
| 2.951 | 77 | 313 | 400 | |
| 2.861 | 2 | 204 | | |
| 2.617 | 22 | 206 | | |
| 2.546 | 2 | 006 | | |
| 2.526 | 14 | 020 | 402 | |
| 2.432 | 2 | 115 | | |

| | | | | | | |
|---|---|---|---|---|---|---|
| 2.422 | 1 | 313 | | | | |
| 2.222 | 1 | 316 | | | | |
| 2.207 | 3 | 223 | 512 | | | |
| 2.136 | 1 | 116 | 510 | | | |
| 2.130 | 14 | 206 | | | | |
| 1.918 | 16 | 420 | | | | |
| 1.913 | 4 | 423 | | | | |
| 1.818 | 22 | 606 | 226 | | | |
| 1.814 | 13 | 513 | 318 | | | |
| 1.704 | 1 | 406 | | | | |
| 1.696 | 1 | 423 | | | | |
| 1.653 | 17 | 712 | 713 | 131 | 027 | 119 |
| 1.644 | 2 | 132 | 518 | | | |
| 1.629 | 7 | 226 | | | | |
| 1.568 | 5 | 133 | | | | |
| 1.540 | 1 | 119 | | | | |
| 1.530 | 9 | 333 | 519 | | | |
| 1.527 | 1 | 802 | 0.0.10 | | | |
| 1.524 | 1 | 331 | 625 | 028 | | |
| 1.477 | 6 | 626 | | | | |
| 1.472 | 3 | 800 | | | | |
| 1.382 | 3 | 533 | 334 | | | |
| 1.378 | 3 | 802 | 606 | | | |
| 1.371 | 2 | 1.1.11 | 136 | 530 | | |
| 1.368 | 4 | 319 | | | | |
| 1.310 | 2 | 823 | | | | |
| 1.306 | 1 | 822 | | | | |
| 1.273 | 6 | 820 | 625 | 533 | 0.0.12 | 338 518 |

Optical and infrared properties of two of the new compounds were obtained. For $La_2Te_4O_{11}$ the shortwave absorption edge occurs at 0.325 microns; the material is then transparent out to 6 microns where a sharp cutoff occurs. Spectra of the neodymium tellurite show the characteristic absorptions of the $Nd^{3+}$ ion with a shortwave absorption edge at 0.34 microns and transparency to 6 microns. Dielectric and electrical resistivity measurements were made on single crystal $La_2Te_4O_{11}$. Table IV shows the results for measurements at a frequency of 1 kilohertz.

TABLE IV

Dielectric Properties of $La_2Te_4O_{11}$

| temperature °C | 25 | 80 | 100 |
|---|---|---|---|
| Capacitance (farad) | 2.6029×10⁻¹² | 2.6331×10⁻¹² | 2.6556×10⁻¹² |
| Dielectric Constant | 14.399 | 14.566 | 14.692 |
| Loss Tangent D Dissipation Factor | 0.00049 | 0.0004 | 0.00041 |
| A.C. Resistivity (Ω–cm) | 4.01×10¹¹ | 3.24×10¹¹ | 1.26×10¹¹ |

Even though only rare earth tellurites of the general formulas $M_2Te_4O_{11}$ and $(A_xB_y)Te_4O_{11}$ have been prepared, those skilled in the art would observe from the data presented herein, particularly referring to Table I, that rare earth tellurties of the general formula $(A_xB_yCD_n...)Te_pO_{11}$ could be prepared. Any mixture of rare earths could be used for the rare earth moiety in preparing the tellurite compound as long as mixture of rare earths comprises a total of about 20 mole percent of the compound. An examination of the data in Table I derived from powder patterns of film and from diffractometer traces shows, from one end of the rare earth series to the other end, i.e., from lanthanum to lutetium, that there is but small differences in the atomic spacing. Therefore, those skilled in the art would conclude that rare earth tellurites containing a mixture of any of the rare earths could be prepared in accordance with the invention disclosed herein.

EXAMPLE IX

Preparation of Praseodymium substituted Lanthanum Tellurite

Eighty-five mole percent of $TeO_2$ (13.56 gm), 5 mole percent of $Pr_2O_3$ (1.65 gm) and 10 mole percent of $La_2O_3$ (3.25 gm) are intimately mixed, placed in a platinum crucible and heated to about 900° C. Upon controlled cooling, mixed light green crystals of praseodymium substituted lanthanum tellurite are obtained. Chemical analysis will show crystals containing about 5.5 mole percent $Pr_2O_3$. The formula may be represented as $(La_xPr_y)Te_4O_{11}$ where $x$ is 1.45 and $y$ is 0.55.

EXAMPLE X

Preparation of Samarium Substituted Lanthanum Tellurite

Eighty mole percent of $TeO_2$ (1.276 gm), 8 mole percent of $Sm_2O_3$ (0.28 gm) and 12 mole percent of $La_2O_3$ (.391 gm) are intimately mixed and pressed into pellet form. The pellets are wrapped in platinum foil and fired in a nitrogen atmosphere at about 800° C for 8 to 10 hours. The reacted oxides are cooled and examined. An off white to cream colored powdered product is obtained.

EXAMPLE XI

Preparation of Lanthanum Substitute Dysprosium Tellurite

Eighty mole percent of $TeO_2$ (1.276 gm), 15 mole percent of $Dy_2O_3$ (0.56 gm) and 5 mole percent of $La_2O_3$ (0.16 gm) are intimately mixed and pressed into pellet form. The pellets are wrapped in platinum foil and fired in a nitrogen atmosphere at about 900° C for 10 to 12 hours. The reacted oxides are cooled and examined. A white powdered product is obtained.

EXAMPLE XII

Preparation of Europium Substituted Lanthanum Tellurite

Eighty-five mole percent of $TeO_2$ (13.56 gm), 12 mole percent of $La_2O_3$ (3.91 gm) and 3 mole percent of $Eu_2O_3$ (1.16 gm) are intimately mixed, placed in a platinum crucible and heated to about 1,000° C. Upon controlled cooling mixed light pink crystals of europium substituted lanthanum tellurite are obtained. Chemical analysis will show crystals containing about 3.8 mole percent $Eu_2O_3$. The formula may be represented as $(La_xEu_y)Te_4O_{11}$ where $x$ is 1.62 and $y$ is 0.38.

EXAMPLE XIII

Preparation of Lanthanum Substituted Lutetium Tellurite

Eighty-five mole percent of $TeO_2$ (13.56), 12 mole percent of $Lu_2O_3$ (4.77 gm) and 3 mole percent of $La_2O_3$ (0.975 gm) are intimately mixed, placed in a platinum crucible and heated to about 950° C. Upon controlled cooling mixed colorless crystals of lanthanum substituted lutetium tellurite are obtained. Chemical analysis will show crystals containing about 3.9 mole percent $Lu_2O_3$. The formula may be represented as $(Lu_xLa_y) Te_4O_{11}$ where $x$ is 1.61 and $y$ is 0.39.

EXAMPLE XIV

Preparation of Neodymium substituted Praseodymium Tellurite

Eighty mole percent of $TeO_2$ (1.276 gm), 15 mole percent of $Pr_2O_3$ (0.496 gm) and 5 mole percent of $Nd_2O_3$ (0.17 gm) are intimately mixed and pressed into pellet form. The pellets are wrapped in platinum foil and fired in a nitrogen atmosphere at about 925° C for 8 to 10 hours. The reacted oxides are cooled and examined. A greenish blue powdered product is obtained.

EXAMPLE XV

Preparation of Praseodymium substituted Europium Tellurite

Eighty mole percent of $TeO_2$ (1.276 gm), 14 mole percent of $Eu_2O_3$ (.49 gm) and 6 mole percent of $Pr_2O_3$ (0.19 gm) are intimately mixed and pressed into pellet form. The pellets are wrapped in platinum foil and fired in a nitrogen atmosphere at about 850° C for 6 to 9 hours. The reacted oxides are cooled and examined. A light yellow powdered product is obtained.

EXAMPLE XVI

Preparation of Dysprosium Substituted Praseodymium Tellurite

Eighty mole percent of $TeO_2$ (1.27 gm), 13 mole percent of $Pr_2O_3$ (0.428 gm) and 7 mole percent of $Dy_2O_3$ (0.26 gm) are intimately mixed and pressed into pellet form. The pellets are wrapped in platinum foil and fired in a nitrogen atmosphere at about 800° C for 8 to 10 hours. The reacted oxides are cooled and examined. A yellow green powdered product is obtained.

EXAMPLE XVII

Preparation of Praseodymium Substituted Thulium Tellurite

Eighty-five mole percent of $TeO_2$ (13.56 gm), 14 mole percent of $Tm_2O_3$ (5.40 gm) and 1 mole percent of $Pr_2O_3$ (.38 gm) are intimately mixed, placed in a platinum crucible and heated to about 900° C. Upon controlled cooling mixed off white crystals of praseodymium substituted thulium tellurite are obtained. Chemical analysis will show crystals containing about 1.4 mole percent $Pr_2O_3$. The formula may be represented as $(Tm_xPr_y) Te_4O_{11}$ where $x$ is 1.86 and $y$ is 0.14.

EXAMPLE XVIII

Preparation of Yttrium Substituted Praseodymium Tellurite

Eighty-five mole percent of $TeO_2$ (13.56 gm), and 3 mole percent of $Y_2O_3$ (0.67 gm) and 12 mole percent $Pr_2O_3$ (3.95 gm) are intimately mixed, placed in a platinum crucible and heated to about 900° C. Upon controlled cooling mixed green colored crystals of yttrium substituted praseodymium tellurite is obtained. Chemical analysis will show crystals containing about 3.6 mole percent $Y_2O_3$. The formula may be represented as $(Pr_xY_y) Te_4O_{11}$ where $x$ is 1.64 and $y$ is 0.36.

EXAMPLE XIX

Preparation of Neodymium Substituted Samarium Tellurite

Eighty mole percent of $TeO_2$ (1.276 gm), 15 mole percent of $Sm_2O_3$ (0.52 gm) and 5 mole percent of $Nd_2O_3$ (.17 gm) are intimately mixed and pressed into pellet form. The pellets are wrapped in platinum foil and fired in a nitrogen atmosphere at about 900° C for 8 to 10 hours. The reacted oxides are cooled and examined. A light blue powdered product is obtained.

EXAMPLE XX

Preparation of Gadolinum Substituted Neodymium Tellurite

Eight-five mole percent of $TeO_2$ (13.56 gm), 10 mole percent of $Nd_2O_3$ (3.36 gm) and 5 mole percent of $Gd_2O_3$ (1.81 gm) are intimately mixed, placed in a platinum crucible and heated to about 1,000° C. Upon controlled cooling light blue mixed crystals of gadolinum substituted neodymium tellurite are obtained. Chemical analysis will show crystals containing about 5.5 mole percent $Gd_2O_3$. The formula may be represented as $(Nd_xGd_y) Te_4O_{11}$ where $x$ is 1.65 and $y$ is 0.55.

EXAMPLE XXI

Preparation of Holmium Substituted Neodymium Tellurite

Eighty mol percent of $TeO_2$ (1.276 gm), 15 mole percent of $Nd_2O_3$ (0.50 gm) and 5 mole percent of $Ho_2O_3$ (0.19 gm) are intimately mixed and pressed into pellet form. The pellets are wrapped in platinum foil and fired in a nitrogen atmosphere at about 900° C for 10 to 12 hours. The reacted oxides are cooled and examined. A light blue powdered product is obtained.

EXAMPLE XXII

Preparation of Ytterbium Substituted Neodymium Tellurite

Eighty mole percent of $TeO_2$ (1.276 gm), 12 mole percent of $Nd_2O_3$ (0.40 gm) and 8 mole percent of $Yb_2O_3$ (0.31 gm) are intimately mixed and pressed into pellet form. The pellets are wrapped in platinum foil and fired in a nitrogen atmosphere at about 800° C for 12 to 14 hours. The reacted oxides are cooled and examined. A blue powdered product is obtained.

EXAMPLE XXIII

Preparation of Europium Substituted Samarium Tellurite

Eighty-five mole percent of $TeO_2$ (13.56 gm), 12 mole percent of $Sm_2O_3$ (4.2 gm) and 3 mole percent of $Eu_2O_3$ (1.05 gm) are intimately mixed, placed in a platinum crucible and heated to about 950° C. Upon controlled cooling very pale pink colored mixed crystals of europium substituted samarium tellurite are obtained. Chemical analysis will show crystals containing about 3.5 mole percent $Eu_2O_3$. THe formula may be represented as $(Sm_xEu_y) Te_4O_{11}$ where $x$ is 1.65 and $y$ is 0.35.

EXAMPLE XXIV

Preparation of Dysprosium Substituted Samarium Tellurite

Eighty-five mole percent of $TeO_2$ (13.56 gm), 10 mole percent of $Sm_2O_3$ (3.48 gm) and 5 mole percent of $Dy_2O_3$ (1.86 gm) are intimately mixed, placed in a platinum crucible and heated to about 900° C. Upon controlled cooling cream to light yellow colored mixed crystals of dysprosium substituted samarium tellurite are obtained. Chemical analysis will show crystals containing about 6 mole percent $Dy_2O_3$. The formula may be represented as $(Sm_xDy_y) Te_4O_{11}$ where $x$ is 1.4 and $y$ is 0.6.

EXAMPLE XXV

Preparation of Samarium Substituted Thulium Tellurite

Eighty mole percent of $TeO_2$ (1.276 gm), 15 mole percent of $Tm_2O_3$ (0.58 gm) and 5 mole percent of $Sm_2O_3$ (.17 gm) are intimately mixed and pressed into pellet form. The pellets are wrapped in platinum foil and fired in a nitrogen atmosphere at about 850° C for 12 to 14 hours. The reacted oxides are cooled and examined. An off white powdered product is obtained.

EXAMPLE XXVI

Preparation of Samarium Substituted Yttrium Tellurite

Eighty-five mole percent of $TeO_2$ (13.56 gm), 14 mole percent of $Y_2O_3$ (3.16 gm) and 1 mole percent of $Sm_2O_3$ (0.38 gm) are intimately mixed, placed in a platinum crucible and heated to about 950° C. Upon controlled cooling faintly yellow to white mixed crystals of samarium substituted yttrium tellurite are obtained. Chemical analysis will show crystals containing about 1.2 mole percent $Sm_2O_3$. The formula may be represented as $(Y_xSm_y) Te_4O_{11}$ where $x$ is 1.88 and $y$ is .12.

EXAMPLE XXVII

Preparation of Gadolinium Substituted Europium Tellurite

Eighty-five mole percent of $TeO_2$ (13.56 gm), 11 mole percent of $Eu_2O_3$ (3.87 gm) and 4 mole percent of $Gd_2O_3$ (1.45 gm) are intimately mixed, placed in a platinum crucible and heated to about 1,000° C. Upon controlled cooling pale pinkish white mixed crystals of gadolinium substituted europium tellurite are obtained. Chemical analysis will show crystals containing about 5 mole percent $Gd_2O_3$. The formula may be represented as $(Eu_xGd_y) Te_4O_{11}$ where $x$ is 1.5 and $y$ is 0.5.

EXAMPLE XXVIII

Preparation of Europium Substituted Holmium Tellurite

Eighty mole percent of $TeO_2$ (1.276 gm), 18 mole percent of $Ho_2O_3$ (0.68 gm) and 2 mole percent of $Eu_2O_3$ (0.07 gm) are intimately mixed and pressed into pellet form. The pellets are wrapped in platinum foil and fired in a nitrogen atmosphere at about 850° C for 10 to 12 hours. The reacted oxides are cooled and examined. A light pinkish powdered product is obtained.

EXAMPLE XXIX

Preparation of Ytterbium Substituted Europium Tellurite

Eighty mole percent of $TeO_2$ (1.276 gm), 12 mole percent of $Eu_2O_3$ (0.42 gm) and 8 mole percent of $Yb_2O_3$ (0.31 gm) are intimately mixed and pressed into pellet form. The pellets are wrapped in platinum foil and fired in a nitrogen atmosphere at about 800° C for 6 to 7 hours. The reacted oxides are cooled and examined. A pale reddish pink powdered product is obtained.

EXAMPLE XXX

Preparation of Dysprosium Substituted Gadolinium Tellurite

Eighty mole percent of $TeO_2$ (1.27 gm), 15 mole percent of $Gd_2O_3$ (0.54 gm) and 5 mole percent of $Dy_2O_3$ (0.18 gm) are intimately mixed and pressed into pellet form. The pellets are wrapped in platinum foil and fired in a nitrogen atmosphere at about 900° C for 8 to 12 hours. The reacted oxides are cooled and examined. A light yellow powdered product is obtained.

EXAMPLE XXXI

Preparation of Erbium Substituted Gadolinium Tellurite

Eight-five mole percent of $TeO_2$ (13.56 gm), 12 mole percent of $Gd_2O_3$ (4.35 gm) and 3 mole percent of $Er_2O_3$ (1.15 gm) are intimately mixed, placed in a platinum crucible and heated to about 900° C. Upon controlled cooling pinkish white mixed crystals of erbium substituted gadolinium tellurite are obtained. Chemical analysis will show crystals containing about 4 mole percent $Er_2O_3$. The formula may be represented as $(Gd_xEr_y) Te_4O_{11}$ where $x$ is 1.6 and $y$ is 0.4.

EXAMPLE XXXII

Preparation of Lutetium Substituted Gadolinium Tellurite

Eighty-five mole percent of $TeO_2$ (13.56 gm), 10 mole percent of $Gd_2O_3$ (3.62 gm) and 5 mole percent of $Lu_2O_3$ (1.99 gm) are intimately mixed, placed in a platinum crucible and heated to about 900° C. Upon controlled cooling off white mixed crystals of lutetium substituted gadolinium tellurite are obtained. Chemical analysis will show crystals containing about 5.5 mole percent $Lu_2O_3$. The formula may be represented as $(Gd_xLu_y) Te_4O_{11}$ where $x$ is 1.45 and $y$ is 0.55.

EXAMPLE XXXIII

Preparation of Holmium Substituted Dysprosium Tellurite

Eighty-five mole percent of $TeO_2$ (13.56 gm), 12 mole percent of $Dy_2O_3$ (4.47 gm) and 3 mole percent of $Ho_2O_3$ (1.13 gm) are intimately mixed, placed in a platinum crucible and heated to about 900° C. Upon controlled cooling light yellow mixed crystals of holmium substituted dysprosium tellurite are obtained. Chemical analysis will show crystals containing about 4 mole percent $Ho_2O_5$. The formula may be represented as $(Dy_xHo_y) Te_4O_{11}$ where $x$ is 1.6 and $y$ is 0.4.

EXAMPLE XXXIV

Preparation of Ytterbium Substituted Dysprosium Tellurite

Eighty mole percent of $TeO_2$ (1.276 gm), 14 mole percent of $Dy_2O_3$ (0.52 gm) and 6 mole percent of $Yb_2O_3$ (0.24 gm) are intimately mixed and pressed into pellet form. The pellets are wrapped in platinum foil and fired in a nitrogen atmosphere at about 1,000° C for 8 to 12 hours. The reacted oxides are cooled and examined. A white powdered product is obtained.

EXAMPLE XXXV

Preparation of Erbium Substituted Holmium Tellurite

Eighty mole percent of $TeO_2$ (1.276 gm), 15 mole percent of $Ho_2O_3$ (0.57 gm) and 5 mole percent of $Er_2O_3$ (0.19 gm) are intimately mixed and pressed into pellet form. The pellets are wrapped in platinum foil and fired in a nitrogen atmosphere at about 850° C for 8 to 10 hours. THe reacted oxides are cooled and examined. A light yellow powdered product is obtained.

EXAMPLE XXXVI

Preparation of Lutetium Substituted Holmium Tellurite

Eighty-five mole percent of $TeO_2$ (13.56 gm), 8 mole percent of $Ho_2O_3$ (3.02 gm) and 7 mole percent of $Lu_2O_3$ (2.78 gm) are intimately mixed, placed in a platinum crucible and heated to about 850° C. Upon controlled cooling white to pale yellow mixed crystals of lutetium substituted holmium tellurite are obtained. Chemical analysis will show crystals containing about 10 mole percent $Lu_2O_3$. The formula may be represented as $(Ho_xLu_y) Te_4O_{11}$ where $x$ is 1 and $y$ is 1.

EXAMPLE XXXVII

Preparation of Thulium Substituted Erbium Tellurite

Eighty-five mole percent of $TeO_2$ (13.56 gm), 10 mole percent of $Er_2O_3$ (3.82 gm) and 5 mole percent of $Tm_2O_3$ (1.93 gm) are intimately mixed, placed in a platinum crucible and heated to about 850° C. Upon controlled cooling pale pink mixed crystals of thulium substituted erbium tellurite are obtained. Chemical analysis will show crystals containing about 6 mole percent $Tm_2O_3$. The formula may be represented as $(Er_xTm_y) Te_4O_{11}$ where $x$ is 1.2 and $y$ is 0.6.

EXAMPLE XXXVIII

Preparation of Erbium Substituted Yttrium Tellurite

Eighty mole percent of $TeO_2$ (1.276 gm), 17 mole percent of $Y_2O_3$ (0.38 gm) and 3 mole percent of $Er_2O_3$ (0.11 gm) are intimately mixed and pressed into pellet form. The pellets are wrapped in platinum foil and fired in a nitrogen atmosphere at about 900° C for 10 to 12 hours. The reacted oxides are cooled and examined. A yellowish white powdered product is obtained.

EXAMPLE XXXIX

Preparation of Ytterbium Substituted Thulium Tellurite

Eighty mole percent of $TeO_2$ (1.276 gm), 15 mole percent of $Tm_2O_3$ (0.58 gm) and 5 mole percent of $Yb_2O_3$ (0.20 gm) are intimately mixed and pressed into pellet form. The pellets are wrapped in platinum foil and fired in a nitrogen atmosphere at about 900° C for 8 to 10 hours. The reacted oxides are cooled and examined. A white powdered product is obtained.

EXAMPLE XL

Preparation of lutetium substituted Ytterbium Tellurite

Eighty-five mole percent of $TeO_2$ (13.56 gm), 10 mole percent of $Yb_2O_3$ (3.9 gm) and 5 mole percent of $Lu_2O_3$ (1.98 gm) are intimately mixed, placed in a platinum crucible and heated to about 1,000° C. Upon controlled cooling white mixed crystals of lutetium substituted ytterbium tellurite are obtained. Chemical analysis will show crystals containing about 6 mole percent $Lu_2O_3$. The formula may be represented as $(Yb_xLu_y) Te_4O_{11}$ where $x$ is 1.4 and $y$ is 0.6.

EXAMPLE XLI

Preparation of Lutetium Substituted Yttrium Tellurite

Eighty-five mole percent of $TeO_2$ (13.56 gm), 12 mole percent of $Y_2O_3$ (2.70 gm) and 3 mole percent of $Lu_2O_3$ (1.19 gm) are intimately mixed, placed in a platinum crucible and heated to about 800° C. Upon controlled cooling yellowish-white mixed crystals of lutetium substituted yttrium tellurite are obtained. Chemical analysis will show crystals containing about 3.8 mole percent $Lu_2O_3$. The formula may be represented as $(Y_xLu_y) Te_4O_{11}$ where $x$ is 1.62 and $y$ is 0.38.

What I claim is:

1. A new composition of matter having the formula $$(A_xB_y)Te_4O_{11}$$

where A and B are a rare earth metal or yttrium, $x$ is from 0 to 2, $y$ is from 0 to 2 and $x$ plus $y$ is 2.

2. The composition of claim 1 wherein A and B are selected from the group of lanthanum, neodymium, samarium, europium, gadolinium, dysprosium, holmium, erbium, thulium, ytterbium, lutetium, and yttrium.

3. A new composition of matter having the formula $$M_2Te_4O_{11}$$

where M is a rare earth metal or yttrium.

4. The composition of claim 3 wherein M is selected from lanthanum, neodymium, samarium, europium, gadolinium, dysprosium, holmium, erbium, thulium, ytterbium, lutetium, and yttrium.

5. The composition of claim 3 wherein M is a mixture of rare earth metals.

6. The method of making the compound $M_2Te_4O_{11}$, where M is selected from lanthanum, neodymium, samarium, europium, gadolinium, dysprosium, holmium, erbium, thulium, ytterbium, lutetium, and yttrium by the solid-state reaction which comprises intimately mixing powders of $M_2O_3$ and $TeO_2$ in a molar ratio of $TeO_2$ to $M_2O_3$ of at least 4:1, compressing the admixture into a cohesive mass, heating in a non-reducing atmosphere at a temperature at least from about 700° C up to the temperature at which the compound begins to decompose, cooling to room temperature and recovering $M_2Te_4O_{11}$.

7. The method of claim 6 wherein M is a mixture of rare earth metals.

8. The method of making single crystals having the general formula $M_2Te_4O_{11}$ where M is selected from lanthanum, neodymium, samarium, europium, gadolinium, dysprosium, holmium, erbium, thulium, ytterbium, lutetium, and yttrium comprising intimately mixing $M_2O_3$ with an excess of $TeO_2$, heating the mixture to its melting point, slowly cooling the melt at no more than 100° C per hour and separating the crystals of $M_2Te_4O_{11}$ from the matrix.

9. The method of claim 8 wherein a seed crystal is introduced into the melt on which the crystal grows.

10. The method of claim 8 wherein M is a mixture of rare earth metals.

* * * * *